United States Patent
Barajas Gonzalez et al.

(10) Patent No.: US 9,600,692 B2
(45) Date of Patent: Mar. 21, 2017

(54) STORAGE SYSTEM SECURITY

(71) Applicant: International Business Machines Corporation, Armonk, NY (US)

(72) Inventors: Emmanuel Barajas Gonzalez, Guadalajara (MX); Shaun E. Harrington, Sahuarita, AZ (US); David C. Reed, Tucson, AZ (US); Max D. Smith, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 112 days.

(21) Appl. No.: 14/517,266

(22) Filed: Oct. 17, 2014

(65) Prior Publication Data
US 2016/0110565 A1    Apr. 21, 2016

(51) Int. Cl.
| | |
|---|---|
| G06F 7/04 | (2006.01) |
| G06F 17/30 | (2006.01) |
| H04N 7/16 | (2011.01) |
| G06F 21/78 | (2013.01) |
| G06F 21/62 | (2013.01) |

(52) U.S. Cl.
CPC .......... G06F 21/78 (2013.01); G06F 21/6218 (2013.01); G06F 2221/2153 (2013.01)

(58) Field of Classification Search
CPC .............. H04L 29/06823; H04L 29/63; H04L 41/0893; G06F 3/0637; G06F 2221/2141
See application file for complete search history.

(56) References Cited

U.S. PATENT DOCUMENTS

| | | | | |
|---|---|---|---|---|
| 6,295,575 B1 * | 9/2001 | Blumenau | ............. | G06F 3/0622 |
| | | | | 711/153 |
| 6,343,324 B1 * | 1/2002 | Hubis | .................. | G06F 3/0622 |
| | | | | 709/229 |
| 8,424,083 B2 | 4/2013 | Fukata et al. | | |
| 2001/0020254 A1 * | 9/2001 | Blumenau | ............... | G06F 9/468 |
| | | | | 709/229 |
| 2005/0097271 A1 * | 5/2005 | Davies | .................. | G06F 3/0607 |
| | | | | 711/114 |

(Continued)

FOREIGN PATENT DOCUMENTS

| | | |
|---|---|---|
| CN | 103473496 A | 12/2013 |
| WO | 2012084397 A1 | 6/2012 |

OTHER PUBLICATIONS

Bull, Storage Area Network (SAN) Installation and Configuration Guide, 2002.*

*Primary Examiner* — Eleni Shiferaw
*Assistant Examiner* — Huan V Doan
(74) *Attorney, Agent, or Firm* — Gregory M. Nordstrom

(57) ABSTRACT

Disclosed aspects include managing access to a particular storage unit in a storage facility. The particular storage unit is coupled, in the storage facility, with both a particular storage unit identifier for the particular storage unit and an access management parameter for managing access to data on the particular storage unit. A device is used to identify the particular storage unit for write protection based on the particular storage unit identifier. In embodiments, the device includes an indicator to visually indicate a proper configuration and the particular storage unit identifier can be a world wide name. Aspects of the disclosure include managing the device for connection with the storage facility and access management for the storage facility.

18 Claims, 4 Drawing Sheets

(56) References Cited

U.S. PATENT DOCUMENTS

| | | | |
|---|---|---|---|
| 2005/0144384 A1* | 6/2005 | Eguchi | G06F 3/0605 711/114 |
| 2008/0212222 A1* | 9/2008 | Feather | G11B 17/225 360/69 |
| 2013/0167226 A1 | 6/2013 | Lin | |

* cited by examiner

STORAGE SYSTEM SECURITY

BACKGROUND

This disclosure relates generally to computer systems and, more particularly, relates to access management of a storage system. The amount of data that needs to be managed by enterprises is growing at an extremely high rate. Management of storage environments may need to be performed securely with as few errors as possible. As data needing to be managed increases, the need for management security, performance, and efficiency may increase.

SUMMARY

Aspects of the disclosure include a device that when attached to a storage facility, would allow for a particular storage unit to become read-only to one or more hosts. The device may be a universal serial bus (USB) dongle with memory that is set-up by an administration program. When set-up at a storage facility, the device can give write protection to the at least a portion of the attached storage facility by identifiers. The device may have visual indicators to indicate proper set-up.

Aspects of the disclosure include managing the device for connection with the storage facility and access management for the storage facility. In embodiments, the device uses an unstructured file system. Disclosed aspects include a first storage unit identifier for the particular storage unit in the storage facility being established on the device. The first storage unit identifier can be used for identifying the particular storage unit for access management. A second storage unit identifier for the particular storage unit in the storage facility is established in the storage facility.

Aspects of the disclosure include detecting a connection between the device and the storage facility. In response, the first storage unit identifier can be transmitted from the device to the storage facility. The storage facility receives the first storage unit identifier from the device. By comparing the first storage unit identifier with the second storage unit identifier, an access management parameter for the particular storage unit is selected. Disclosed aspects provide a system/methodology for managing access to a particular storage unit of a storage facility that may provide security, performance, or efficiency benefits.

DETAILED DESCRIPTION

Figure 1:
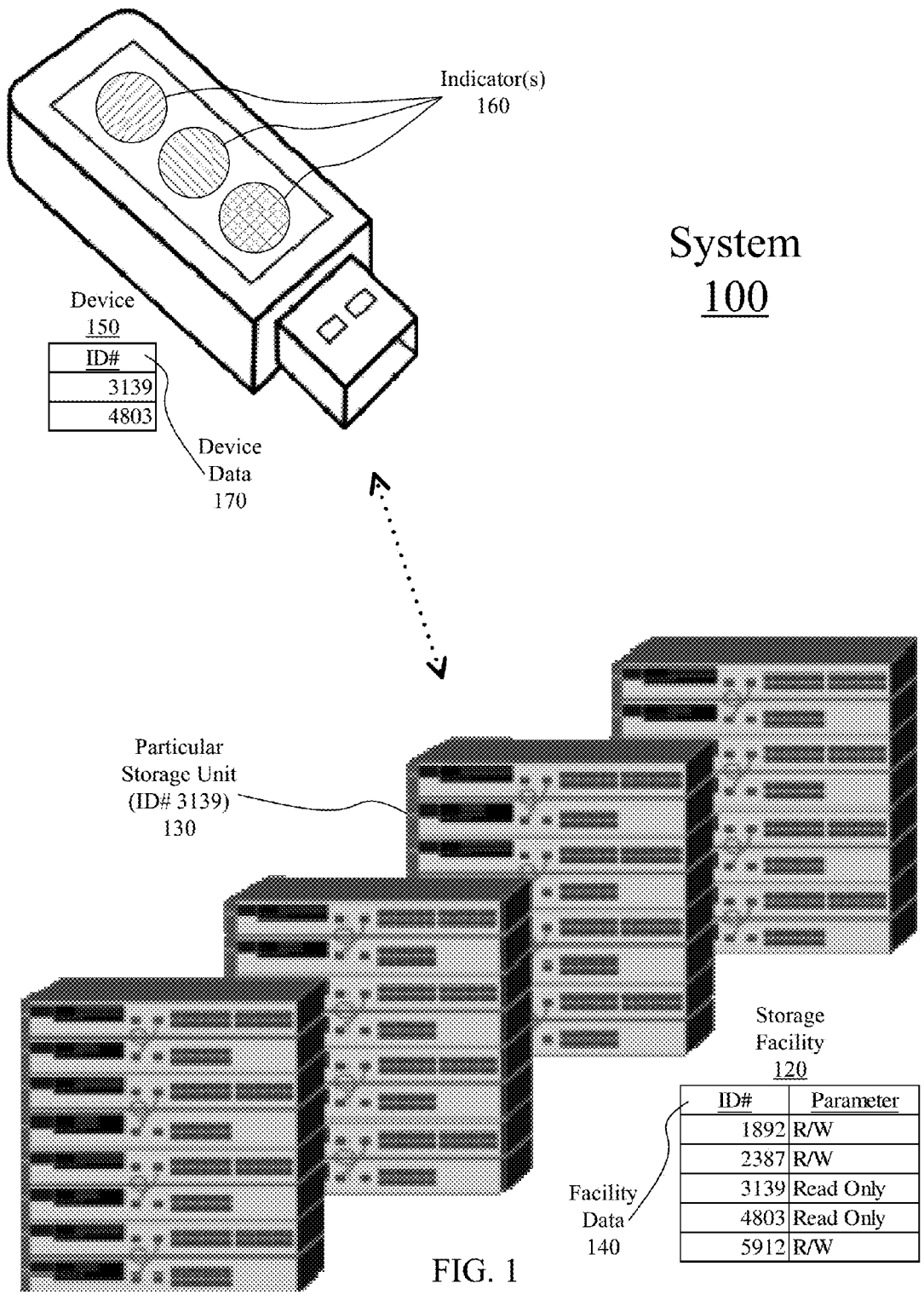
FIG. 1 depicts a system for managing access to a particular storage unit in a storage facility according to embodiments.

Aspects of the disclosure include a device that when attached to a storage facility, would allow for specified logical unit numbers (LUNs) to become read-only to, for example, any and all hosts. As such, device-based software-defined virtual device protection is disclosed. The disclosure provides, while using modern methods of storage area network (SAN) zoning and LUN masking, a secure methodology of having data be accessible but not changeable. The device may be a universal serial bus (USB) dongle with memory that is set-up by an administration program. When set-up at a storage facility, the device can give write protection to the at least a portion of the attached storage facility by identifiers. The device may have visual indicators to indicate proper set-up.

Having a physical device responsible for write protection offers the user features including physical storage locking, radio-frequency identification (RFID) tagging, efficient swapping, and physical protection from offsite intrusion. The user can make data accessible throughout the SAN with potentially increased security benefits related to data tampering/loss (whether it is accidental or malicious). For instance, a particular storage unit can be made read-only by a writable USB dongle. In particular, specific data that may need to be retained/accessible for a significant period time and but that is not going to change may benefit from aspects of the disclosure (e.g., bank statements, tax documents).

Aspects of the disclosure include a method, system, and computer program product for managing access to a particular storage unit in a storage facility (i.e., storage system). The method, system, and computer program product may work on a number of operating systems. In the storage facility, the particular storage unit may be coupled with a particular storage unit identifier and an access management parameter. The particular storage unit identifier being for the particular storage unit. The access management parameter being for managing access to data on the particular storage unit. A device can be connected to the storage facility. The device is utilized to identify the particular storage unit for write protection based on the particular storage unit identifier. In embodiments, the device uses an unstructured file system (e.g., absent of a traditional structured file system). In embodiments, an indicator is present to visually indicate a proper configuration of the system.

Aspects of the disclosure include a first storage unit identifier (e.g., world wide name) for a particular storage unit (e.g., logical unit number) in the storage facility being established on the device. The first storage unit identifier can be used for identifying the particular storage unit for access management. A second storage unit identifier for the particular storage unit in the storage facility is established in the storage facility. In embodiments, establishing the first storage unit identifier may be performed subsequent to establishing the second storage unit identifier.

Aspects of the disclosure include detecting a connection between the device and the storage facility. In response, the first storage unit identifier can be transmitted from the device to the storage facility. The storage facility receives the first storage unit identifier from the device (e.g., using firmware). By comparing the first storage unit identifier with the second storage unit identifier, an access management parameter for the particular storage unit is selected. The access management parameter is for determining, in response to an access request to the particular storage unit, whether to initiate processing of the access request (e.g., write protecting the particular storage unit when the storage unit identifiers match). In embodiments, an indicator on the device uses a visually identifiable feature to provide state information (e.g., configuration status, connection status, transmission status). Altogether, aspects of the disclosure provide a system/methodology for managing access to a particular storage unit of a storage facility that may provide security, performance, or efficiency benefits.

FIG. 1 depicts a system 100 for managing access to a particular storage unit 130 in a storage facility 120 (e.g., group of servers) according to embodiments. The particular storage unit 130 (e.g., logical unit number) may be physical or logical. In the storage facility 120, the particular storage unit 130 may be coupled with (e.g., communicatively linked to an illustrative database) a particular storage unit identifier (e.g., worldwide name, "3139") and an access management parameter (e.g., "Read Only"). The particular storage unit identifier being for the particular storage unit 130. The access management parameter being for managing access to data on the particular storage unit 130. For example, the access management parameter may be used by the storage facility 120 in response to receiving an access request from a user to the storage facility 120 or, more specifically, the particular storage unit 130. Aspects may be considered facility data 140.

A device 150 (e.g., a universal serial bus (USB) dongle) can be connected to the storage facility 120. The device 150 is utilized to identify the particular storage unit 130 for write protection based on the particular storage unit identifier. (e.g., worldwide name, "3139"). Aspects may be considered device data 170. In embodiments, the device 150 uses an unstructured file system (e.g., raw data/formats). The unstructured file system may deter/prevent mounting of the device by generic means. As such, external users may be deterred/prevented from attempting to mount and change permissions. The device may have flash storage or volatile memory (e.g., a limited size flash drive). In embodiments, the device includes a cyclic redundancy check (CRC) checksum for detecting a change to data based on a set of check values. For instance, the CRC checksum can be obtained from a totality of data written to the device (e.g., flash storage). The system 100 may use the CRC checksum for data integrity/security purposes (e.g., using device data 170, device data including CRC checksum information).

The device can be configured by an administration program (e.g., having a graphical user interface and configured to access the limited size flash drive). Writing/reading from the device may occur using a 'dd' command. As such, the administration program may be necessary to write data to the unstructured file system of the device. In embodiments, an indicator 160 is present to visually indicate a proper configuration of the system (e.g., using lights of varying colors). For example, the device can have a tricolor light to signify a task being performed such as "red" when not enabled or set-up, white when properly connected to the administration program, or green when properly connected to firmware of the storage facility 120. As such, the device 150 allows for efficient verification of both a completed configuration and a read-only component while keeping data of the system securely accessible.

In embodiments, the administration program can be a graphical user interface (GUI) for installation on the machine of a user that may allow for it to be configurable within the SAN of the user (installation modules may be unnecessary/absent). From the GUI the user could define the specific LUNs by their respective worldwide names that they wish to only be granted read-only access. Non-specified access may default to typical SAN settings such as being write-permissible. A GUI representation may be available via default software of a storage administrator. When connecting to that specific storage, the GUI representation may disallow changes to be made, may not have the capability to make changes, but may allow for verification of set-up. In various embodiments, the device is used as a definer for the system storage hardware as to which physical LUNs should be selected/marked as read-only. The scope can be based upon specific hardware units and worldwide names in that the firmware within actual storage can deny attempts to change the data for the listed worldwide names.

Figure 2:
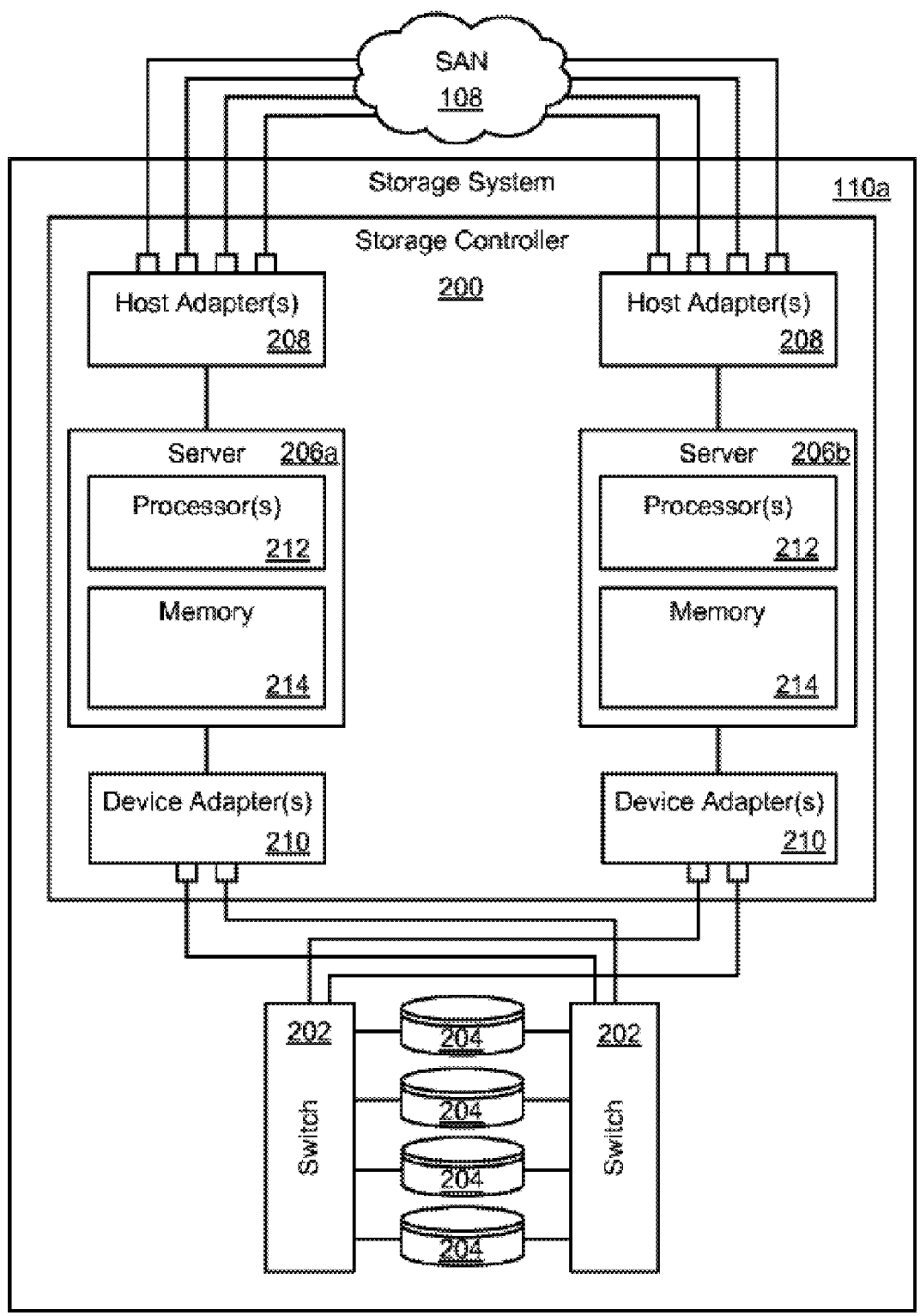
FIG. 2 illustrates an example storage system according to embodiments.

FIG. 2 illustrates an example storage system 110a containing an array of storage devices 204 (e.g., hard-disk drives and/or solid-state drives) according to embodiments. The internal components of the storage system 110a are shown in accordance with the disclosure and may be used to manage such a storage system 110a. Nevertheless, techniques according to the disclosure may also be implemented within other storage systems 110, 112. As shown, the storage system 110a includes a storage controller 200, one or more switches 202, and one or more storage devices 204, such as hard-disk drives or solid-state drives (e.g., flash-memory-based drives). The storage controller 200 may enable one or more hosts 106 (e.g., open system and/or mainframe servers 106) to access data stored in the one or more storage devices 204.

As shown in FIG. 2, the storage controller 200 includes one or more servers 206. The storage controller 200 may also include host adapters 208 and device adapters 210 to connect the storage controller 200 to host devices 106 and storage devices 204, respectively. Multiple servers 206a, 206b may provide redundancy to ensure that data is always available to connected hosts 106. Thus, when one server 206a fails, the other server 206b may remain functional to ensure that I/O is able to continue between the hosts 106 and the storage devices 204. This process may be referred to as a "failover."

Particular enterprise storage systems may have a storage system 110a having an architecture similar to that illustrated in FIG. 2. Particular enterprise storage systems may include a high-performance, high-capacity storage controller providing disk storage that is designed to support continuous operations. Particular enterprise storage systems may use servers 206a, 206b, which may be integrated with a virtualization engine technology. Nevertheless, techniques according to the disclosure are not limited to any specific enterprise storage system 110a, but may be implemented in any comparable or analogous storage system 110 regardless of the manufacturer, product name, or components or component names associated with the storage system 110. Any storage system 110 that could benefit from techniques according to the disclosure is deemed to fall within the scope of the disclosure. Thus, the enterprise storage system shown is presented only by way of example and is not intended to be limiting.

In selected embodiments, each server 206 includes one or more processors 212 (e.g., n-way symmetric multiprocessors) and memory 214. The memory 214 may include volatile memory (e.g., RAM) as well as non-volatile memory (e.g., ROM, EPROM, EEPROM, hard disks, flash memory, etc.). The volatile memory and non-volatile memory may store software modules that run on the processor(s) 212 and are used to access data in the storage devices 204. The servers 206 may host at least one instance of these software modules. These software modules may manage all read and write requests to logical volumes in the storage devices 204.

Figure 3:
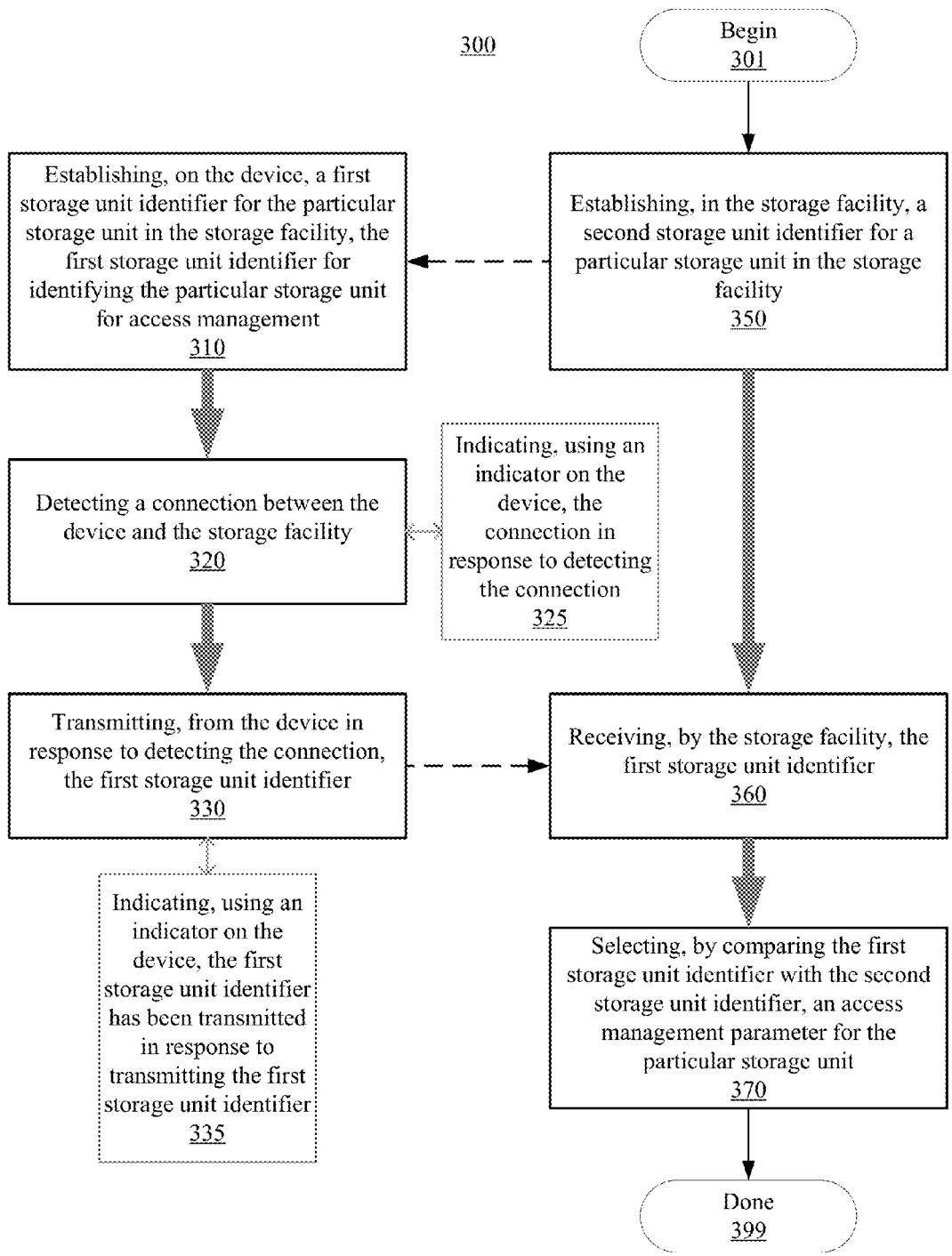
FIG. 3 is a flowchart illustrating a method for storage system security according to embodiments.

FIG. 3 is a flowchart illustrating a method 300 for storage system security according to embodiments. The method may include aspects directed toward managing a device having memory for connection with a storage facility (blocks 310, 320, 325, 330, 335) or aspects directed toward access management for a storage facility (blocks 350, 360, 370). The method 300 may compare a first storage unit identifier with a second storage unit identifier and write-protect a particular storage unit when the first and second storage unit identifiers match. The method 300 may begin at block 301.

At block 350, the second storage unit identifier for the particular storage unit (e.g., logical unit number) in the storage facility is established in the storage facility. In embodiments, the second storage unit identifier may be a world wide name. The second storage unit identifier may be used for access management. Access management can include responding to access requests to the storage facility (e.g., to the particular storage unit). As such, access management may include determining whether to initiate processing of an access request (e.g., write protection for aspects of the storage facility such as the particular storage unit). Accordingly, access management can include both allowing a read access and disallowing a write access (making the particular storage unit read-only).

At block 310, the first storage unit identifier for the particular storage unit in the storage facility is established on the device. The first storage unit identifier can be used for identifying the particular storage unit for access management. In embodiments, the first storage unit identifier may be a world wide name. Using world wide names to identify particular storage units can allow for efficient write-protection by using preexisting information related to the particular storage units in the storage facility.

At block 320, a connection is detected between the device and the storage facility. The connection can include a security/integrity check (e.g., using CRC checksum). In response to the connection, the device may be write-protected (e.g., not even raw formatted data can be changed). In embodiments, an indicator on the device can provide state information. For example, the indicator may provide configuration status or connection status as at block 325. The indicator may use a visually identifiable feature (e.g., one or more lights which can have different/varying colors) to provide the state information.

At block 330, the first storage unit identifier is transmitted from the device to the storage facility. Transmission may be triggered in response to the connection. For example, in response to detecting the connection, a threshold criterion may be created for when transmission occurs (e.g., immediately, when storage facility resources reach a threshold, at a certain time of day). In embodiments, the indicator on the device can provide state information such as transmission status as at block 335 (e.g., one or more identifiers have been transmitted/sent from the device to the storage facility).

At block 360, the storage facility receives the first storage unit identifier from the device (e.g., using firmware). Firmware may be used to receive or accept delivery of the first storage unit identifier. For example, firmware may be used to detect the connection, verify data integrity/security, or read from the device. In embodiments, firmware may be considered a recipient but not a provider with respect to the device (e.g., the firmware may pull/subscribe to data from the device but may not push/publish data/settings to the device).

At block 370, the first storage unit identifier is compared with the second storage unit identifier to select an access management parameter for the particular storage unit. The access management parameter is for determining, in response to an access request to the particular storage unit, whether to initiate processing of the access request (e.g., write protecting the particular storage unit when the storage unit identifiers match). For example, the first storage unit identifier may be determined to match the second storage unit identifier when they are the same or identical (e.g., same world wide name). In response to determining the first storage unit identifier matches the second storage unit identifier the access management parameter may be determined and subsequently configured. The configuration can include both allowing a read access and disallowing a write access. Accordingly, the access management parameter may be set to a value which both allows the read access and disallows the write access. For example, if "0" allows all access requests and "1" only allows read requests, the access management parameter may be set to "1" in response to the first and second storage unit identifiers being identical.

Various embodiments may operate similarly in using the access management parameter or equivalents. In embodiments, an access request including a third storage unit identifier is received (by the storage facility for the particular storage unit). The third storage unit identifier is compared with the second storage unit identifier. The second storage unit identifier already matching the first storage unit identifier. The third storage unit identifier may be determined to match the second storage unit identifier (and the first storage unit identifier). Subsequently a disallowance for the access request can be processed. Such processing may include a disallowance notification.

The method 300 may conclude at block 399. The method 300 may operate with an inherent expectation of complete file access across the board, thereby operating as a limiting factor for file changes. Altogether, aspects of the method 300 provide a methodology for managing access to a particular storage unit of a storage facility that may provide security, performance, or efficiency benefits.

Figure 4:
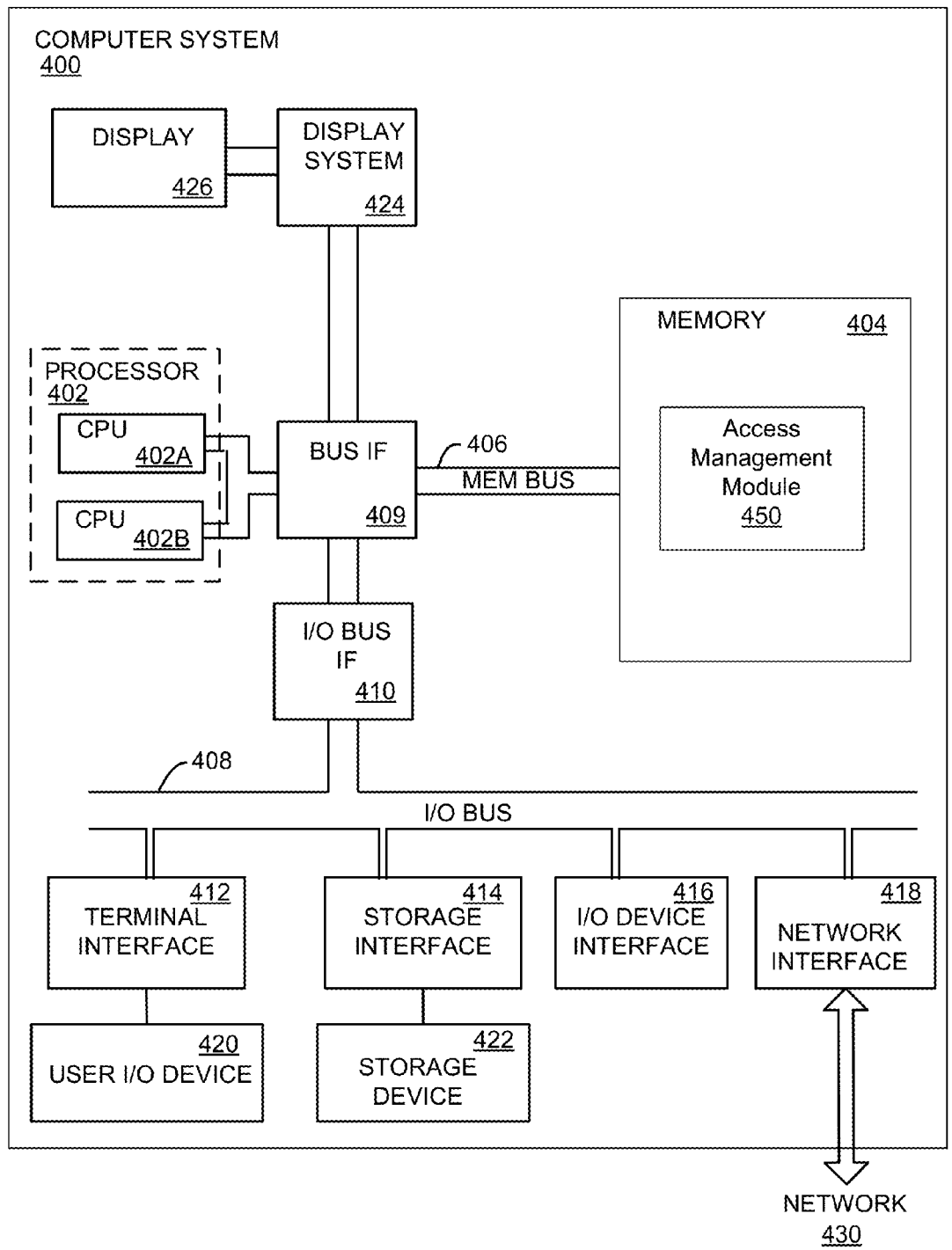
FIG. 4 depicts a high-level block diagram of a computer system for implementing various embodiments.

FIG. 4 depicts a high-level block diagram of a computer system 400 for implementing various embodiments. The mechanisms and apparatus of the various embodiments disclosed herein apply equally to any appropriate computing system. The major components of the computer system 400 include one or more processors 402, a memory 404, a terminal interface 412, a storage interface 414, an I/O (Input/Output) device interface 416, and a network interface 418, all of which are communicatively coupled, directly or indirectly, for inter-component communication via a memory bus 406, an I/O bus 408, bus interface unit 409, and an I/O bus interface unit 410.

The computer system 400 may contain one or more general-purpose programmable central processing units (CPUs) 402A and 402B, herein generically referred to as the processor 402. In embodiments, the computer system 400 may contain multiple processors; however, in certain embodiments, the computer system 400 may alternatively be a single CPU system. Each processor 402 executes instructions stored in the memory 404 and may include one or more levels of on-board cache.

In embodiments, the memory 404 may include a random-access semiconductor memory, storage device, or storage medium (either volatile or non-volatile) for storing or encoding data and programs. In certain embodiments, the memory 404 represents the entire virtual memory of the computer system 400, and may also include the virtual memory of other computer systems coupled to the computer system 400 or connected via a network. The memory 404 can be conceptually viewed as a single monolithic entity, but in other embodiments the memory 404 is a more complex arrangement, such as a hierarchy of caches and other memory devices. For example, memory may exist in multiple levels of caches, and these caches may be further divided by function, so that one cache holds instructions while another holds non-instruction data, which is used by the processor or processors. Memory may be further distributed and associated with different CPUs or sets of CPUs, as is known in any of various so-called non-uniform memory access (NUMA) computer architectures.

The memory 404 may store all or a portion of the various programs, modules and data structures for processing data transfers as discussed herein. For instance, the memory 404 can store an access management module 450. In embodiments, the access management module 450 may include instructions or statements that execute on the processor 402 or instructions or statements that are interpreted by instructions or statements that execute on the processor 402 to carry out the functions as further described herein. In certain embodiments, the access management module 450 is implemented in hardware via semiconductor devices, chips, logical gates, circuits, circuit cards, and/or other physical hardware devices in lieu of, or in addition to, a processor-based system. In embodiments, the access management module 450 may include data in addition to instructions or statements.

The computer system 400 may include a bus interface unit 409 to handle communications among the processor 402, the memory 404, a display system 424, and the I/O bus interface unit 410. The I/O bus interface unit 410 may be coupled with the I/O bus 408 for transferring data to and from the various I/O units. The I/O bus interface unit 410 communicates with multiple I/O interface units 412, 414, 416, and 418, which are also known as I/O processors (IOPs) or I/O adapters (IOAs), through the I/O bus 408. The display system 424 may include a display controller, a display memory, or both. The display controller may provide video, audio, or both types of data to a display device 426. The display memory may be a dedicated memory for buffering video data. The display system 424 may be coupled with a display device 426, such as a standalone display screen, computer monitor, television, or a tablet or handheld device display. In one embodiment, the display device 426 may include one or more speakers for rendering audio. Alternatively, one or more speakers for rendering audio may be coupled with an I/O interface unit. In alternate embodiments, one or more of the functions provided by the display system 424 may be on board an integrated circuit that also includes the processor 402. In addition, one or more of the functions provided by the bus interface unit 409 may be on board an integrated circuit that also includes the processor 402.

The I/O interface units support communication with a variety of storage and I/O devices. For example, the terminal interface unit 412 supports the attachment of one or more user I/O devices 420, which may include user output devices (such as a video display device, speaker, and/or television set) and user input devices (such as a keyboard, mouse, keypad, touchpad, trackball, buttons, light pen, or other pointing device). A user may manipulate the user input devices using a user interface, in order to provide input data and commands to the user I/O device 420 and the computer system 400, and may receive output data via the user output devices. For example, a user interface may be presented via the user I/O device 420, such as displayed on a display device, played via a speaker, or printed via a printer.

The storage interface 414 supports the attachment of one or more disk drives or direct access storage devices 422 (which are typically rotating magnetic disk drive storage devices, although they could alternatively be other storage devices, including arrays of disk drives configured to appear as a single large storage device to a host computer, or solid-state drives, such as flash memory). In some embodiments, the storage device 422 may be implemented via any type of secondary storage device. The contents of the memory 404, or any portion thereof, may be stored to and retrieved from the storage device 422 as needed. The I/O device interface 416 provides an interface to any of various other I/O devices or devices of other types, such as printers or fax machines. The network interface 418 provides one or more communication paths from the computer system 400 to other digital devices and computer systems; these communication paths may include, e.g., one or more networks 430.

Although the computer system 400 shown in FIG. 4 illustrates a particular bus structure providing a direct communication path among the processors 402, the memory 404, the bus interface 409, the display system 424, and the I/O bus interface unit 410, in alternative embodiments the computer system 400 may include different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface unit 410 and the I/O bus 408 are shown as single respective units, the computer system 400 may, in fact, contain multiple I/O bus interface units 410 and/or multiple I/O buses 408. While multiple I/O interface units are shown, which separate the I/O bus 408 from various communications paths running to the various I/O devices, in other embodiments, some or all of the I/O devices are connected directly to one or more system I/O buses.

In various embodiments, the computer system 400 is a multi-user mainframe computer system, a single-user system, or a server computer or similar device that has little or no direct user interface, but receives requests from other computer systems (clients). In other embodiments, the computer system 400 may be implemented as a desktop computer, portable computer, laptop or notebook computer, tablet computer, pocket computer, telephone, smart phone, or any other suitable type of electronic device.

FIG. 4 depicts several major components of the computer system 400. Individual components, however, may have greater complexity than represented in FIG. 4, components other than or in addition to those shown in FIG. 4 may be present, and the number, type, and configuration of such components may vary. Several particular examples of additional complexity or additional variations are disclosed herein; these are by way of example only and are not necessarily the only such variations. The various program components illustrated in FIG. 4 may be implemented, in various embodiments, in a number of different manners, including using various computer applications, routines, components, programs, objects, modules, data structures, etc., which may be referred to herein as "software," "computer programs," or simply "programs."

In addition to embodiments described above, other embodiments having fewer operational steps, more operational steps, or different operational steps are contemplated. Also, some embodiments may perform some or all of the above operational steps in a different order. The modules are listed and described illustratively according to an embodiment and are not meant to indicate necessity of a particular module or exclusivity of other potential modules (or functions/purposes as applied to a specific module).

In the foregoing, reference is made to various embodiments. It should be understood, however, that this disclosure is not limited to the specifically described embodiments. Instead, any combination of the described features and elements, whether related to different embodiments or not, is contemplated to implement and practice this disclosure. Many modifications and variations may be apparent to those of ordinary skill in the art without departing from the scope and spirit of the described embodiments. Furthermore, although embodiments of this disclosure may achieve advantages over other possible solutions or over the prior art, whether or not a particular advantage is achieved by a given embodiment is not limiting of this disclosure. Thus, the described aspects, features, embodiments, and advantages are merely illustrative and are not considered elements or limitations of the appended claims except where explicitly recited in a claim(s).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Embodiments according to this disclosure may be provided to end-users through a cloud-computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud-computing resources are provided to a user on a pay-per-use basis, where users are charged only for the computing resources actually used (e.g., an amount of storage space used by a user or a number of virtualized systems instantiated by the user). A user can access any of the resources that reside in the cloud at any time, and from anywhere across the Internet. In context of the present disclosure, a user may access applications or related data available in the cloud. For example, the nodes used to create a stream computing application may be virtual machines hosted by a cloud service provider. Doing so allows a user to access this information from any computing system attached to a network connected to the cloud (e.g., the Internet).

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to exemplary embodiments, other and further embodiments of the invention may be devised without departing from the basic scope thereof, and the scope thereof is determined by the claims that follow.

What is claimed is:

1. A system for managing access to a storage unit included in a storage facility, the system comprising:
    the storage unit, wherein the storage unit is associated, in the storage facility, with a first storage unit identifier, wherein the storage unit includes a logical unit number, wherein the first storage unit identifier includes a first world-wide name, and wherein the storage unit is associated with an access management parameter for managing access to data stored on the storage unit; and
    a dongle device comprising a storage medium within the dongle device and a visual indicator on the dongle device, wherein the visual indicator comprises a tricolor light, wherein the dongle device is insertable into the storage facility, and wherein a visual state of the visual indicator tricolor light indicates a configuration status associated with the storage facility setting the access management parameter to a write protection value;
    the storage facility, wherein the storage facility is configured to:
    detect inserting the dongle device into the storage facility;
    transfer from the storage medium within the dongle device to the storage facility, in response to the detecting insertion of the dongle device into the storage facility, a second storage unit identifier, wherein the second storage unit identifier includes a second world wide name;
    determine that the second storage unit corresponds to the first storage unit identifier; and,
    set, based on determining that the second storage unit identifier corresponds to the first storage unit identifier, the access management parameter to the write protection value.

2. The system of claim 1, wherein the visual state indicator tricolor light includes a plurality of visual states, and wherein the plurality of visual states comprises at least one of: the dongle device not set-up, the dongle device properly connected to an administration program, the dongle device properly connected to the storage facility, successful transmission of the second storage unit identifier to the storage facility, and the access management parameter successfully configured.

3. The system of claim 1, wherein the storage medium within the dongle device includes an unstructured file system, and wherein the second storage unit identifier is stored in the unstructured file system.

4. The system of claim 1, wherein the access management parameter is for determining, in response to an access request to the storage unit, whether to allow the access request.

5. The system of claim 1, wherein storage unit is one of a physical unit of storage and a logical unit of storage.

6. A computer-implemented method for managing access to a storage unit included in a storage facility, wherein the storage unit is associated, in the storage facility, with a first storage unit identifier, wherein the storage unit includes a logical unit number, wherein the first storage unit identifier includes a first world-wide name, and wherein the method comprises:
    detecting insertion of a dongle device into the storage facility, wherein the dongle device comprises a storage medium within the dongle device and a visual indicator on the dongle device, wherein the visual indicator comprises a tricolor light, wherein a second storage unit identifier, corresponding to the first storage identifier, is stored in the storage medium, wherein the second storage unit identifier includes a second world wide name, wherein the storage unit is associated with an access management parameter for managing access to data stored on the storage unit, and wherein a visual state of the visual indicator tricolor light indicates a configuration status associated with the storage facility setting the access management parameter to a write protection value;
    transferring, in response to the detecting the insertion, the second storage unit identifier from the storage medium within the dongle device to the storage facility; and
    setting, based on the second storage unit corresponding to the first storage unit identifier, the access management parameter to the write protection value.

7. The method of claim 6, wherein the access management parameter is for determining, in response to an access request to the storage unit, to initiate processing of the access request.

8. The method of claim 6, wherein the write protection value comprises both allowing a read access and disallowing a write access.

9. The method of claim 6, further comprising:
    receiving, for the storage unit, an access request including a third storage unit identifier;
    determining that the third storage unit identifier corresponds to the first storage unit identifier; and, in response to determining that the third storage unit identifier matches corresponds to the first storage unit identifier, disallowing the access request.

10. The method of claim 6, wherein the visual state indictor tricolor light includes a plurality of visual states, and wherein the plurality of visual states comprises at least one of: the dongle device not set-up, the dongle device properly connected to an administration program, the dongle device properly connected to the storage facility, successful transmission of the second storage unit identifier to the storage facility, and the access management parameter successfully configured.

11. The method of claim 6, wherein detecting the insertion of the dongle device into the storage facility further comprises creating a threshold criterion for when the transfer of the second storage unit identifier from the storage medium within the dongle device to the storage facility occurs.

12. The method of claim 6, wherein the storage unit is one of a physical unit of storage and a logical unit of storage.

13. A computer program product for managing access to a storage unit included in a storage facility, wherein the storage unit is identified, in the storage facility, by a first storage unit identifier, wherein the storage unit includes a logical unit number, wherein the first storage unit identifier includes a first world-wide name, wherein the computer program product comprises a computer readable storage medium having program instructions embodied therewith, wherein the computer readable storage medium is not a transitory signal per se, and wherein the program instructions are executable by a processor to cause the processor to:

detect insertion of a dongle device into the storage facility, wherein the dongle device comprises a storage medium within the dongle device and a visual indicator on the dongle device, wherein the visual indicator comprises a tricolor light, wherein a second storage unit identifier is stored in the storage medium, wherein the second storage unit identifier includes a second world wide name, wherein the second storage identifier corresponds to the first storage identifier, wherein the storage unit is associated with an access management parameter for managing access to data stored on the storage unit, and wherein a visual state of the visual indicator tricolor light indicates a configuration status associated with the storage facility setting the access management parameter to a write protection value;

transfer, in response to the detecting the insertion, the second storage unit identifier from the storage medium within the dongle device to the storage facility;

determine that the second storage unit corresponds to the first storage unit identifier; and set, based on the second storage unit corresponding to the first storage unit identifier, the access management parameter to the write protection value.

14. The computer program product of claim 13, wherein the access management parameter is for determining, in response to an access request to the storage unit, to initiate processing of the access request, and wherein the write protection value signifies to disallow processing the access request.

15. The computer program product of claim 13, wherein the write protection value comprises both allowing a read access and disallowing a write access.

16. The computer program product of claim 13, wherein the program instructions executable by the processor further comprise program instructions to cause the processor to:

receive, for the storage unit, an access request including a third storage unit identifier;

compare the third storage unit identifier with the first storage unit identifier;

determine that the third storage unit identifier corresponds to the first storage unit identifier; and, in response to determining that the third storage unit identifier corresponds to the second storage unit identifier, disallow the access request.

17. The computer program product of claim 13, wherein the visual state indicator tricolor light includes a plurality of visual states, and wherein the plurality of visual states comprises at least one of: the dongle device not set-up, the dongle device properly connected to an administration program, the dongle device properly connected to the storage facility, successful transmission of the second storage unit identifier to the storage facility, and the access management parameter successfully configured.

18. The computer program product of claim 13, wherein the storage unit is one of a physical unit of storage and a logical unit of storage.

* * * * *